(12) United States Patent
Kanaya

(10) Patent No.: US 11,318,788 B2
(45) Date of Patent: May 3, 2022

(54) RUBBER COMPOSITION FOR TIRE TREAD, OR RUBBER COMPOSITION FOR TIRE SIDEWALL

(71) Applicant: Toyo Tire Corporation, Itami (JP)

(72) Inventor: Masaki Kanaya, Itami (JP)

(73) Assignee: TOYO TIRE CORPORATION, Itami (JP)

(*) Notice: Subject to any disclaimer, the term of this patent is extended or adjusted under 35 U.S.C. 154(b) by 233 days.

(21) Appl. No.: 16/675,371

(22) Filed: Nov. 6, 2019

(65) Prior Publication Data

US 2020/0139762 A1 May 7, 2020

(30) Foreign Application Priority Data

Nov. 7, 2018 (JP) .............................. JP2018-209523
Nov. 7, 2018 (JP) .............................. JP2018-209541

(51) Int. Cl.
*B60C 1/00* (2006.01)
*C08K 3/013* (2018.01)
*C08L 7/00* (2006.01)
*C08L 9/00* (2006.01)
*C08K 3/26* (2006.01)

(52) U.S. Cl.
CPC .......... *B60C 1/0016* (2013.01); *B60C 1/0025* (2013.01); *C08K 3/013* (2018.01); *C08K 3/26* (2013.01); *C08L 7/00* (2013.01); *C08L 9/00* (2013.01); *C08K 2003/262* (2013.01)

(58) Field of Classification Search
CPC ..... B60C 1/0016; B60C 1/0025; C08K 3/013; C08L 7/00; C08L 9/00
USPC ....................................................... 523/155
See application file for complete search history.

(56) References Cited

U.S. PATENT DOCUMENTS

2009/0326109 A1  12/2009  Kameda et al.

FOREIGN PATENT DOCUMENTS

| CN | 107513190 A | * | 12/2017 |
| JP | 3919729 B2 | | 5/2007 |
| JP | 2010-31260 A | | 2/2010 |
| JP | 2012-207088 A | | 10/2012 |
| JP | 2018-35250 A | | 3/2018 |

OTHER PUBLICATIONS

Machine translation of CN 107513190 A (Year: 2017).*
Pancil PS-M (Year: 2016).*
Antibacterial Action of a Condensed Tannin Extracted from Astringent Persimmon as a Component of Food Addictive Pancil PS-M on Oral Polymicrobial Biofilms, Tomiyama et al (Year: 2016).*

* cited by examiner

*Primary Examiner* — Doris L Lee
(74) *Attorney, Agent, or Firm* — Westerman, Hattori, Daniels & Adrian, LLP

(57) ABSTRACT

A rubber composition for tire tread or a rubber composition for tire sidewall, comprising one or more rubber components, and a composite powder which comprises a persimmon fruit extract and sodium carbonate and which is in an amount of 1.0 to 10 parts by mass when a total amount of the rubber component(s) is regarded as 100 parts by mass. In the rubber compositions, it is preferable that in the composite powder, a ratio by mass of the persimmon fruit extract to the sodium carbonate is from 1:1 to 5:1. Moreover, in the rubber compositions, it is preferable that when a total amount of the rubber component(s) is regarded as 100 parts by mass, an effective component amount of the persimmon fruit extract in the composite powder is from 0.01 to 8.0 parts by mass.

6 Claims, No Drawings

RUBBER COMPOSITION FOR TIRE TREAD, OR RUBBER COMPOSITION FOR TIRE SIDEWALL

BACKGROUND OF THE INVENTION

Field of the Invention

The present invention relates to a rubber composition for tire tread, and particularly to a rubber composition that is a raw material for pneumatic tire which is decreased in odor peculiar to a rubber and which is excellent in on-ice performances. The invention further relates to a rubber composition for tire sidewall, and particularly to a rubber composition that is a raw material for a pneumatic tire which is decreased in odor peculiar to a rubber and which is excellent in fatigue resistance.

Description of the Related Art

In general, tires are used in various running environments, and are required in winter to exhibit, for example, gripping performance even on icy roads. In pneumatic tires, their tread member plays a great role for an improvement of gripping performance. However, rubber members occupying a major portion of the tread member generally have a peculiar odor. Thus, in the market, the odor peculiar to a rubber is required to be decreased. Additionally, in particular, a sidewall member repeatedly receives vibration in a state that a load is applied thereto when the tires are running. Thus, the sidewall member is required to be excellent in fatigue resistance. A rubber member occupying a major portion of the sidewall member generally has a peculiar odor. Thus, in the market, the odor to peculiar to a rubber is required to be decreased.

Patent Document 1 listed below describes a method for producing a natural-rubber/white-filler composite that includes the step of mixing a natural rubber latex with a white filler, applying highly purifying treatment to the resultant mixture, and then solidifying/drying the resultant.

Moreover, Patent Document 2 listed below describes a rubber composition for a tire in which 5 to 130 parts by weight of an inorganic filler and 0.01 to 10 parts by weight of a tea extract containing catechin are blended into 100 parts by weight of a diene rubber.

Patent Document 3 listed below describes a method for producing a rubber wet masterbatch that includes the step of adding tannin to a filler-containing rubber latex solution, solidifying the resultant, and then drying the solidified product.

Furthermore, Patent Document 4 listed below describes a method for producing a deodorant against a sulfur-based offensive odor, characterized by charging water into a juice extraction of persimmon fruits, stirring the resultant liquid to yield a mixed solution, and then adding thereto a solution of sodium carbonate to adjust the pH value thereof into a value from 8.5 to 9.0.

PRIOR ART DOCUMENTS

Patent Documents

Patent Document 1: JP-A-2018-35250
Patent Document 2: JP-A-2010-31260
Patent Document 3: JP-A-2012-207088
Patent Document 4: Japanese Patent No. 3919729

SUMMARY OF THE INVENTION

However, eager investigations made by the Inventor have made it evident that techniques described in Patent Documents 1 to 3 described above do not make it easy to provide a pneumatic tire in which while odor peculiar to a rubber is decreased, on-ice performances or fatigue resistance is improved. Patent Document 4 listed above describes a technique related to a deodorant agent. This document never takes up, as a problem, an odor peculiar to pneumatic tires (rubbers). Needless to say, the document neither describes nor suggests an improvement of pneumatic tires in various performances.

In the light of the actual situation, the present invention has been made. An object thereof is to provide a rubber composition that is a raw material for a pneumatic tire which is decreased in odor peculiar to a rubber and which is excellent in on-ice performances. Another object thereof is to provide a rubber composition that is a raw material for a pneumatic tire which is decreased in odor peculiar to a rubber and which is excellent in fatigue resistance.

One of the objects can be attained by a first aspect of the present invention. Accordingly, the first aspect of the present invention relates to a rubber composition for tire tread, including one or more rubber components, and a composite powder which includes a persimmon fruit extract and sodium carbonate and which is in an amount of 1.0 to 10 parts by mass when a total amount of the rubber component(s) is regarded as 100 parts by mass.

The rubber composition according to the first aspect of the present invention includes a composite powder including a persimmon fruit extract and sodium carbonate. Accordingly, when the rubber composition is finally made into a pneumatic tire, the following can be compatible with each other: (1) a decrease in odor peculiar to a rubber; and (2) an improvement in on-ice performances. A reason why these advantageous effects are gained is unclear; however, the reason can be presumed, for example, as follows:

(1) When at least the persimmon fruit extract and sodium carbonate are composited into each other to be made into a powder, condensed tannin, which is contained in the persimmon fruit extract, is partially oxidized, so that the following can be added to a molecule of tannin: not only reducing power which the condensed tannin originally has, but also oxidizing power. This makes it possible to exhibit deodorant effect against both of a component deodorized by oxidizing reaction and a component deodorized by reducing reaction. Thus, chemical reactions are caused between the partially-oxidized condensed tannin, and odor components contained in the rubber(s), such as nitrogen compounds, sulfur compounds and/or lower aliphatic acids, so that odor peculiar to a rubber can be decreased.

(2) The composite powder including the persimmon fruit extract and sodium carbonate is easily soluble in water. This composite powder is easily dissolved in water and dropped away from the tire by the fact that the resultant pneumatic tire is worn out by running, and subsequently, when the surface of the tire is brought into contact with water. As a result, in the tire surface, fine voids are formed which correspond to particles of the dropped composite powder. The fine voids formed in the tire surface can absorb, for example, a water membrane of an icy road to improve the tire in gripping performance on ice.

When the total amount of the rubber component(s) is regarded as 100 parts by mass in the present invention, the invention can attain the compatibility of a decrease in odor peculiar to a rubber with an improvement in on-ice performances by setting the blend amount of the composite powder into a range from 1.0 to 10 parts by mass. By setting this blend amount into 10 parts by mass or less, the rubber composition can be further stabilized in vulcanizing rate, and the finally obtained pneumatic tire can maintain abrasion resistance.

In the above-defined rubber composition for tire tread, a ratio by mass of the persimmon fruit extract to the sodium carbonate is preferably from 1:1 to 5:1 in the composite powder. When, in the rubber composition for tire tread, the total amount of the rubber component(s) is regarded as 100 parts by mass, an effective component amount of the persimmon fruit extract in the composite powder is preferably from 0.01 to 8.0 parts by mass. This embodiment favorably makes it possible, particularly, to further decrease the odor peculiar to a rubber.

Furthermore, the other object of the present invention can be attained by a second aspect of the present invention. Accordingly, the second aspect of the invention relates to a rubber composition for tire sidewall, including one or more rubber components, and a composite powder which includes a persimmon fruit extract and sodium carbonate and which is in an amount of 1.0 to 10 parts by mass when a total amount of the rubber component(s) is regarded as 100 parts by mass.

The rubber composition according to the second aspect of the present invention includes a composite powder including a persimmon fruit extract and sodium carbonate. Accordingly, when the rubber composition is finally made into a pneumatic tire, the following can be compatible with each other: (1) a decrease in odor peculiar to a rubber; and (2) an improvement in fatigue resistance. A reason why these advantageous effects are gained is unclear; however, the reason can be presumed, for example, as follows:

(1) When at least the persimmon fruit extract and sodium carbonate are composited into each other to be made into a powder, condensed tannin, which is contained in the persimmon fruit extract, is partially oxidized, so that the following can be added to a molecule of tannin: not only reducing power which the condensed tannin originally has, but also oxidizing power. This makes it possible to exhibit deodorant effect against both of a component deodorized by oxidizing reaction and a component deodorized by reducing reaction. Thus, chemical reactions are caused between the partially-oxidized condensed tannin, and odor components contained in the rubber(s), such as nitrogen compounds, sulfur compounds and/or lower aliphatic acids, so that odor peculiar to a rubber can be decreased.

(2) Condensed tannin contained in the persimmon fruit extract has a large number of phenolic hydroxyl groups in the molecules thereof. The groups trap radicals generated in the rubber that has repeatedly received vibrations in a state that a load is applied thereto. As a result, a rubber member of the sidewall is restrained from being deteriorated to be improvable in fatigue resistance.

When, in the present invention, the amount of the rubber component(s) is regarded as 100 parts by mass, the blend amount of this composite powder is set into a value from 1.0 to 10 parts by mass. In this way, the rubber composition of the invention can attain the compatibility of a decrease in odor peculiar to a rubber with an improvement in fatigue resistance. When this blend amount is set into 10 parts by mass or less, the vulcanizing rate of the rubber composition can be further stabilized.

In the rubber composition for tire sidewall, it is preferable that in the composite powder, a ratio by mass of the persimmon fruit extract to the sodium carbonate be from 1:1 to 5:1. In the rubber composition for tire sidewall, it is preferable that when the total amount of the rubber component(s) is regarded as 100 parts by mass, an effective component amount of the persimmon fruit extract in the composite powder be from 0.01 to 8.0 parts by mass. This embodiment favorably makes it possible, particularly, to further decrease the odor peculiar to a rubber.

DETAILED DESCRIPTION OF THE PREFERRED EMBODIMENTS

The rubber composition for tire tread according to the present invention includes at least, as essential components, one or more rubber components, and a composite powder which includes a persimmon fruit extract and sodium carbonate.

The rubber composition for tire tread or the rubber composition for tire sidewall according to the present invention preferably includes, as the rubber component(s), one or more diene rubbers. Examples of the diene rubber(s) include natural rubber (NR), polyisoprene rubber (IR), polybutadiene rubber (BR), polystyrenebutadiene rubber (SBR), chloroprene rubber (CR), and nitrile rubber (NBR).

The composite powder includes, as essential components, at least a persimmon fruit extract and sodium carbonate. The persimmon fruit extract contains condensed tannin, which is one polyphenolic species. This condensed tannin has a large number of phenolic hydroxyl groups (OH groups), and these groups bond chemically to various components of offensive odors contained in the rubber to exhibit a deodorant effect. When the condensed tannin is composited with sodium carbonate to be partially oxidized, odor peculiar to a rubber can be decreased at a high level. The composite powder includes, as essential components, a persimmon fruit extract and sodium carbonate, and may include, for example, water soluble polymers such as trehalose and cellulose.

When the total amount of the rubber component(s) is regarded as 100 parts by mass, the blend amount of the composite powder is preferably set into a range preferably from 1.0 to 10 parts, more preferably from 3.0 to 8.0 parts by mass in order that the rubber composition can attain the compatibility of a decrease in odor peculiar to a rubber with an improvement in on-ice performances with a good balance.

Moreover, in order that the rubber composition can attain the compatibility of a decrease in odor peculiar to a rubber with an improvement in on-ice performances with a good balance, the ratio by mass of the persimmon fruit extract to sodium carbonate is preferably from 1:1 to 5:1, more preferably from 2:1 to 4:1 in the composite powder. When the total amount of the rubber component(s) is regarded as 100 parts by mass in the rubber composition for pneumatic tire, the effective amount of the persimmon fruit extract in the composite powder is preferably from 0.01 to 8.0 parts, more preferably 0.3 to 5 parts by mass. The content of sodium carbonate in the composite powder is not particularly limited as far as the content permits the above-mentioned two to be satisfied, the two being the effective component amount of the persimmon fruit extract in the composite powder, and the ratio by mass of the persimmon fruit extract to sodium carbonate.

Blending agents known by those skilled in the art can be blended into the rubber composition for tire tread or the rubber composition for sidewall according to the present invention as components other than the rubber component(s) and the composite powder including the persimmon fruit extract and sodium carbonate. Examples of the blending agents include carbon black, silica, a silane coupling agent, a vulcanization-related blending agent, an antiaging agent, zinc oxide, stearic acid, softeners such as wax and oil, and a working aid.

The carbon black is carbon black used in an ordinary rubber industry, such as SAF, ISAF, HAF, FEF, or GPF. The carbon black may be an electroconductive carbon black such as acetylene black or Ketchen black. In the rubber composition for tire tread or the rubber composition for sidewall according to the present invention, the carbon black is blended in an amount preferably from 10 to 120 parts by mass, more preferably from 20 to 100 parts by mass for 100 parts by mass of the diene rubber.

The silica may be, for example, wet silica, dry silica, sol-gel silica or surface-treated silica, which is used for reinforcing an ordinary rubber. Out of these silica species, wet silica is preferred.

The silane coupling agent is not particularly limited as far as the agent contains, in the molecule thereof, sulfur. The silane coupling agent may be a silane coupling agent that may be of various species which are blendable, together with silica, into a rubber composition. Examples of the silane coupling agent include sulfide silanes such as bis(3-triethoxysilylpropyl)tetrasulfide (for example, "Si69" manufactured by the company Degussa), bis(3-triethoxysilylpropyl)disulfide (for example, "Si75" manufactured by the company Deggusa), bis(2-triethoxysilylethyl)tetrasulfide, bis(4-triethoxysilylbutyl)disulfide, bis(3-trimethoxysilylpropyl)tetrasulfide, bis(2-trimethoxysilylethyl)disulfide; and mercaptosilanes such as γ-mercaptoproplytrimethoxysilane, γ-mercaptoproplytriethoxysilane, mercaptoproplymethyldimethoxysilane, mercaptoproplydimethylmethoxysilane, mercaptoethyltriethoxysilane; and protected mercaptosilanes such as 3-octanoylthio-1-propyltriethoxysilane, 3-propionylthiopropyltrimethoxysilane.

The antiaging agents may each be an antiaging agent usable usually for rubbers, examples thereof including aromatic amine type, amine-ketone type, monophenolic type, bisphenolic type, polyphenolic type, dithiocarbamic acid salt type, and thiourea type antiaging agents. These may be used singly or in the form of an appropriate mixture.

Examples of the vulcanization-related blending agent include vulcanizers such as sulfur and organic peroxides, vulcanization promoters, vulcanization promoter aids, and vulcanization retardants.

The species of sulfur as the vulcanization-related vulcanizer may be any ordinary sulfur species for a rubber. Examples thereof include powdery sulfur, precipitated sulfur, insoluble sulfur, and highly dispersible sulfur.

The vulcanization promoters may each be a vulcanization promoter usable ordinarily for vulcanizing rubbers. Examples thereof include sulfenamide type, thiuram type, thiazole type, thiourea type, guanidine type, and dithiocarbamic acid salt type vulcanization promoters. These may be used singly or in the form of an appropriate mixture.

The rubber composition according to the present invention can be yielded by using a mixing machine used in an ordinary rubber industry, such as a Banbury mixer, a kneader or a roll, to mix and knead one or more rubber components, a composite powder including a persimmon fruit extract and sodium carbonate, and further optional components, such as carbon black, silica, a silane coupling agent, a vulcanization-related blending agent, an antiaging agent, zinc oxide, stearic acid, softeners such as wax and oil, and a working aid.

The method for blending the above-mentioned individual components is not particularly limited, and may be, for example, any one of the following: a method of kneading, in advance, components other than the vulcanization-related blending agent such as the sulfur-based vulcanizer and the vulcanization promoter to prepare a masterbatch, adding the remaining components thereto, and further kneading the resultant; a method of adding the individual components in any order, and then kneading the resultant; and a method of adding all the components simultaneously, and kneading the resultant.

Examples

Hereinafter, a description will be made about working examples specifically demonstrating the subject matters, the advantageous effects and others of the present invention. About evaluation items in each of the working example and other examples, a rubber composition in the example was heated at 160° C. for 30 minutes and vulcanized. The resultant rubber sample was evaluated in each evaluating method described below.

(1) Rubber Odor Evaluation

In accordance with JIS Z9080, odor of the rubber is subjected to a sensory evaluation. The odor is subjected to six-stage evaluation. As the resultant numerical value is higher, a stronger odor is felt. This means that the rubber cannot be decreased in odor.

(2) Ice Braking Performance

On an icy road having temperatures of −3±3° C., an ABS operation is applied to a 2000-cc 4-WD car with tires having the rubber and running at 40 km/hour to measure the braking distance thereof (the average of values obtained according to n=10). About the evaluation thereof, the value of that in Comparative Example 1 is regarded as 100 to make an index evaluation. The rubber is evaluated as a value relative to the value. It is meant that as the resultant numerical value is larger, the rubber is shorter in braking distance to be better.

(3) Abrasion Resistance

In accordance with JIS K6264, a Lambourm abrasion test machine manufactured by Iwamoto Quartz Glass Labo Co., Ltd. is used to measure the abrasion loss of the rubber under conditions of a load of 40 N and a slip ratio of 30%. About the evaluation thereof, the resultant value is represented as an index relative to the value of that in Comparative Example 1, which is regarded as 100. As the resultant numerical value index is larger, the abrasion resistance is better.

(4) Fatigue Resistance

In accordance with JIS K 6260, a measurement thereof was made at 23° C. The number of times of the flexing of a test piece of the vulcanized rubber was gained until a crack growth therein turned to a length of 2 mm. The result was represented as an index relative to the value of that in Comparative Example 1, which was regarded as 100. It is demonstrated that as the index is larger, the fatigue resistance is better.

(Preparation of Each Rubber Composition)

In accordance with a blending formulation in Table 1, components in each of Examples 1 to 3, and Comparative Examples 1 to 5 were blended into each other. An ordinary Banbury mixer was then used to knead the components to prepare a rubber composition. The individual blending agents shown in Table 1 are shown below (In Table 1, the blend amount of each of these blending agents is shown as the numerical value of parts by mass thereof that is relative to 100 parts by mass of the corresponding rubber component(s)).

a) Natural rubber (NR): "RSS #3";
b) Butadiene rubber (BR): "BR 150B", manufactured by Ube Industries, Ltd.;
c) Carbon black: "SEAST 6", manufactured by Tokai Carbon Co., Ltd.;
d) Stearic acid: "BEADS STEARIC ACID", manufactured by NOF Corp.;
e) Zinc oxide: "Zinc Oxide, Type II", manufactured by Mitsui Mining & Smelting Co., Ltd.;
f) Inorganic filler (A) (white filler): "NOVELIGFHT TT", manufactured by Nitto Funka Kogyo K. K.;
g) Inorganic filler (B) (sodium carbonate): "SODIUM CARBONATE", manufactured by FujiFilm Corp., Wako Pure Chemical Industries, Ltd.;
h) Condensed tannin: "CONDENSED TANNIN", manufactured by Kawamura Corp.;
i) Composite powder including a persimmon fruit extract and sodium carbonate: "PANCIL PS-M", manufactured by Rilis Co., Ltd.;
j) Antiaging agent: "NOCRAC 6C", manufactured by Ouchi Shinko Chemical Industrial Co., Ltd.;
k) Sulfur: "POWDERY SULFUR", manufactured by Tsurumi Chemical Industry Co., Ltd.; and
l) Vulcanization promoter: "SOXINOL CZ", manufactured by Sumitomo Chemical Co., Ltd.

From Table 1, it is understood that in abrasion resistance, the vulcanized rubber of the rubber composition according to each of Examples 1 to 3 were equivalent to or larger than the vulcanized rubber of the rubber composition according to Comparative Example 1. Simultaneously, the former rubber was decreased in odor and was further better in on-ice performances.

(Preparation of Each Rubber Composition)

In accordance with a blending formulation in Table 2, rubber components in each of Examples 4 to 6 and Comparative Examples 6 to 10 were blended into each other. An ordinary Banbury mixer was then used to knead the resultant to prepare a rubber composition. The individual blending agents shown in Table 2 are described below (in Table 2, the blend amount of each of the blending agents is represented as the number of parts by mass relative to 100 parts by mass of the corresponding rubber component).

a) Natural rubber (NR): "RSS #3";
b) Butadiene rubber (BR): "BR 150B", manufactured by Ube Industries, Ltd.;
c) Carbon black (N550): "SEAST SO", manufactured by Tokai Carbon Co., Ltd.;
d) Stearic acid: "BEADS STEARIC ACID", manufactured by NOF Corp.;
e) Zinc oxide: "Zinc Oxide, Type II", manufactured by Mitsui Mining & Smelting Co., Ltd.;
f) Inorganic filler (A) (white filler): "NOVELIGFHT TT", manufactured by Nitto Funka Kogyo K. K.;
g) Inorganic filler (B) (sodium carbonate): "SODIUM CARBONATE", manufactured by FujiFilm Corp., Wako Pure Chemical Industries, Ltd.;
h) Condensed tannin: "CONDENSED TANNIN", manufactured by Kawamura Corp.;
i) Composite powder including a persimmon fruit extract and sodium carbonate: "PANCIL PS-M", manufactured by Rilis Co., Ltd.;
j) Antiaging agent: "NOCRAC 6C", manufactured by Ouchi Shinko Chemical Industrial Co., Ltd.;
k) Sulfur: "POWDERY SULFUR", manufactured by Tsurumi Chemical Industry Co., Ltd.; and
l) Vulcanization promoter: "SOXINOL CZ", manufactured by Sumitomo Chemical Co., Ltd.

TABLE 1

|  | Comparative Example 1 | Comparative Example 2 | Comparative Example 3 | Comparative Example 4 | Comparative Example 5 | Example 1 | Example 2 | Example 3 |
|---|---|---|---|---|---|---|---|---|
| NR | 70 | 70 | 70 | 70 | 70 | 70 | 70 | 70 |
| BR | 30 | 30 | 30 | 30 | 30 | 30 | 30 | 30 |
| Carbon black | 40 | 40 | 40 | 40 | 40 | 40 | 40 | 40 |
| Zinc oxide | 3 | 3 | 3 | 3 | 3 | 3 | 3 | 3 |
| Stearic acid | 2 | 2 | 2 | 2 | 2 | 2 | 2 | 2 |
| Inorganic filler (A) | — | 5 | — | — | — | — | — | — |
| Inorganic filler (B) | — | — | 0.5 | — | — | — | — | — |
| Condensed tannin | — | — | — | 1.5 | — | — | — | — |
| Composite powder including persimmon fruit extract and sodium carbonate | — | — | — | — | 30 | 1 | 5 | 10 |
| (Sodium carbonate amount (effective component)) | (—) | (—) | (0.5) | (—) | (3) | (0.1) | (0.5) | (1) |
| (Condensed tannin amount (effective component)) | (—) | (—) | (—) | (1.5) | (0) | (0.3) | (1.5) | (3) |
| Antiaging agent | 1 | 1 | 1 | 1 | 1 | 1 | 1 | 1 |
| Sulfur | 2 | 2 | 2 | 2 | 2 | 2 | 2 | 2 |
| Vulcanization promoter | 1.5 | 1.5 | 1.5 | 1.5 | 1.5 | 1.5 | 1.5 | 1.5 |
| Rubber odor evaluation | 5 | 5 | 5 | 4 | 2 | 3 | 2 | 2 |
| Ice Braking performance | 100 | 100 | 103 | 105 | 110 | 106 | 115 | 123 |
| Abrasion resistance | 100 | 97 | 100 | 105 | 85 | 100 | 103 | 100 |

TABLE 2

|  | Comparative Example 6 | Comparative Example 7 | Comparative Example 8 | Comparative Example 9 | Comparative Example 10 | Example 4 | Example 5 | Example 6 |
| --- | --- | --- | --- | --- | --- | --- | --- | --- |
| NR | 50 | 50 | 50 | 50 | 50 | 50 | 50 | 50 |
| BR | 50 | 50 | 50 | 50 | 50 | 50 | 50 | 50 |
| Carbon black | 30 | 30 | 30 | 30 | 30 | 30 | 30 | 30 |
| Zinc oxide | 3 | 3 | 3 | 3 | 3 | 3 | 3 | 3 |
| Stearic acid | 2 | 2 | 2 | 2 | 2 | 2 | 2 | 2 |
| Inorganic filler (A) | — | 5 | — | — | — | — | — | — |
| Inorganic filler (B) | — | — | 0.1 | — | — | — | — | — |
| Condensed tannin | — | — | — | 1.5 | — | — | — | — |
| Composite powder including persimmon fruit extract and sodium carbonate | — | — | — | — | 30 | 1 | 5 | 10 |
| (Sodium carbonate amount (effective component)) | (—) | (—) | (0.1) | (—) | (3) | (0.1) | (0.5) | (1) |
| (Condensed tannin amount (effective component)) | (—) | (—) | (—) | (1.5) | (0) | (0.3) | (1.5) | (3) |
| Antiaging agent | 2 | 2 | 2 | 2 | 2 | 2 | 2 | 2 |
| Sulfur | 2 | 2 | 2 | 2 | 2 | 2 | 2 | 2 |
| Vulcanization promoter | 1 | 1 | 1 | 1 | 1 | 1 | 1 | 1 |
| Rubber odor evaluation | 5 | 5 | 5 | 4 | 2 | 3 | 2 | 2 |
| Fatigue resistance | 100 | 95 | 100 | 116 | 80 | 106 | 118 | 112 |

From Table 2, it is understood that the vulcanized rubber of the rubber composition according to each of Examples 4 to 6 is decreased in odor and further better in fatigue resistance than the vulcanized rubber of the rubber composition according to Comparative Example 6.

What is claimed is:

1. A rubber composition for tire tread, comprising one or more rubber components, and a composite powder which comprises a persimmon fruit extract and sodium carbonate and which is in an amount of greater than 2.5 to 10 parts by mass when a total amount of the rubber component(s) is regarded as 100 parts by mass.

2. The rubber composition for tire tread according to claim 1, wherein in the composite powder, a ratio by mass of the persimmon fruit extract to the sodium carbonate is from 1:1 to 5:1.

3. The rubber composition for tire tread according to claim 1, wherein when a total amount of the rubber component(s) is regarded as 100 parts by mass, an effective component amount of the persimmon fruit extract in the composite powder is from 0.01 to 8.0 parts by mass.

4. A rubber composition for tire sidewall, comprising one or more rubber components, and a composite powder which comprises a persimmon fruit extract and sodium carbonate and which is in an amount of greater than 2.5 to 10 parts by mass when a total amount of the rubber component(s) is regarded as 100 parts by mass.

5. The rubber composition for tire sidewall according to claim 4, wherein in the composite powder, a ratio by mass of the persimmon fruit extract to the compound sodium carbonate is from 1:1 to 5:1.

6. The rubber composition for tire sidewall according to claim 4, wherein when a total amount of the rubber component(s) is regarded as 100 parts by mass, an effective component amount of the persimmon fruit extract in the composite powder is from 0.01 to 8.0 parts by mass.

* * * * *